C. F. PENN.
VEHICLE CHASSIS.
APPLICATION FILED APR. 6, 1921.
1,414,749.
Patented May 2, 1922.
3 SHEETS—SHEET 1.
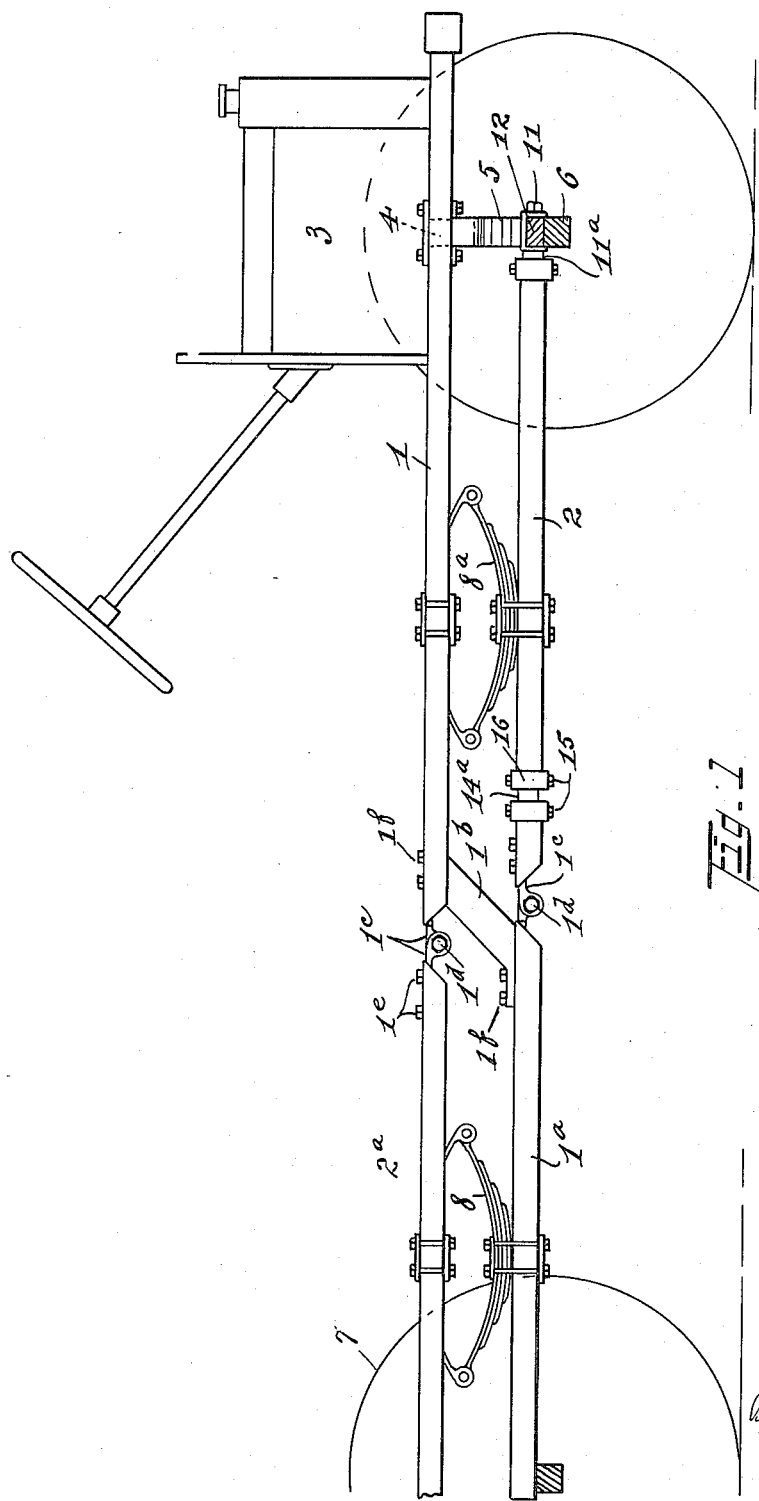

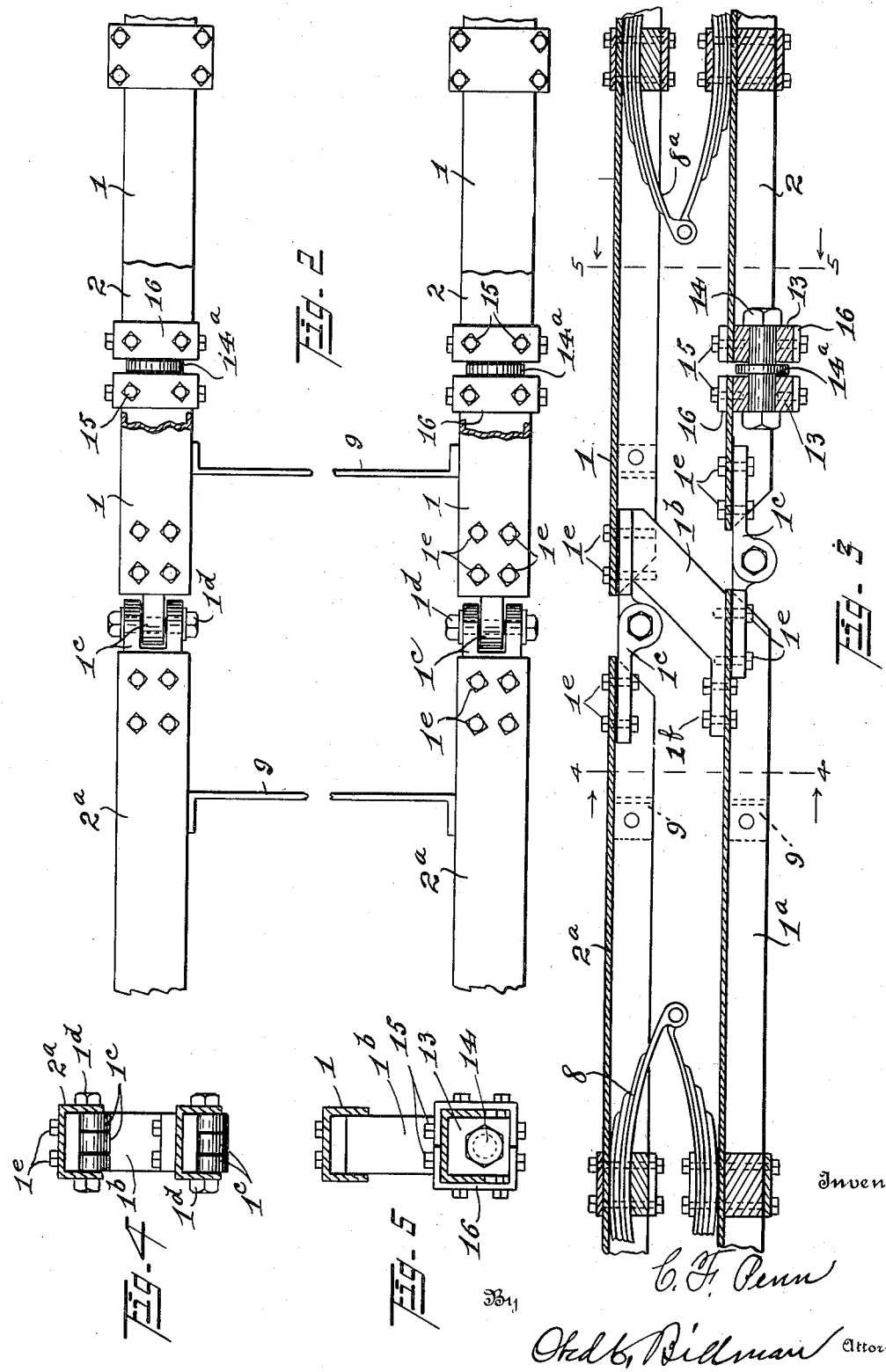

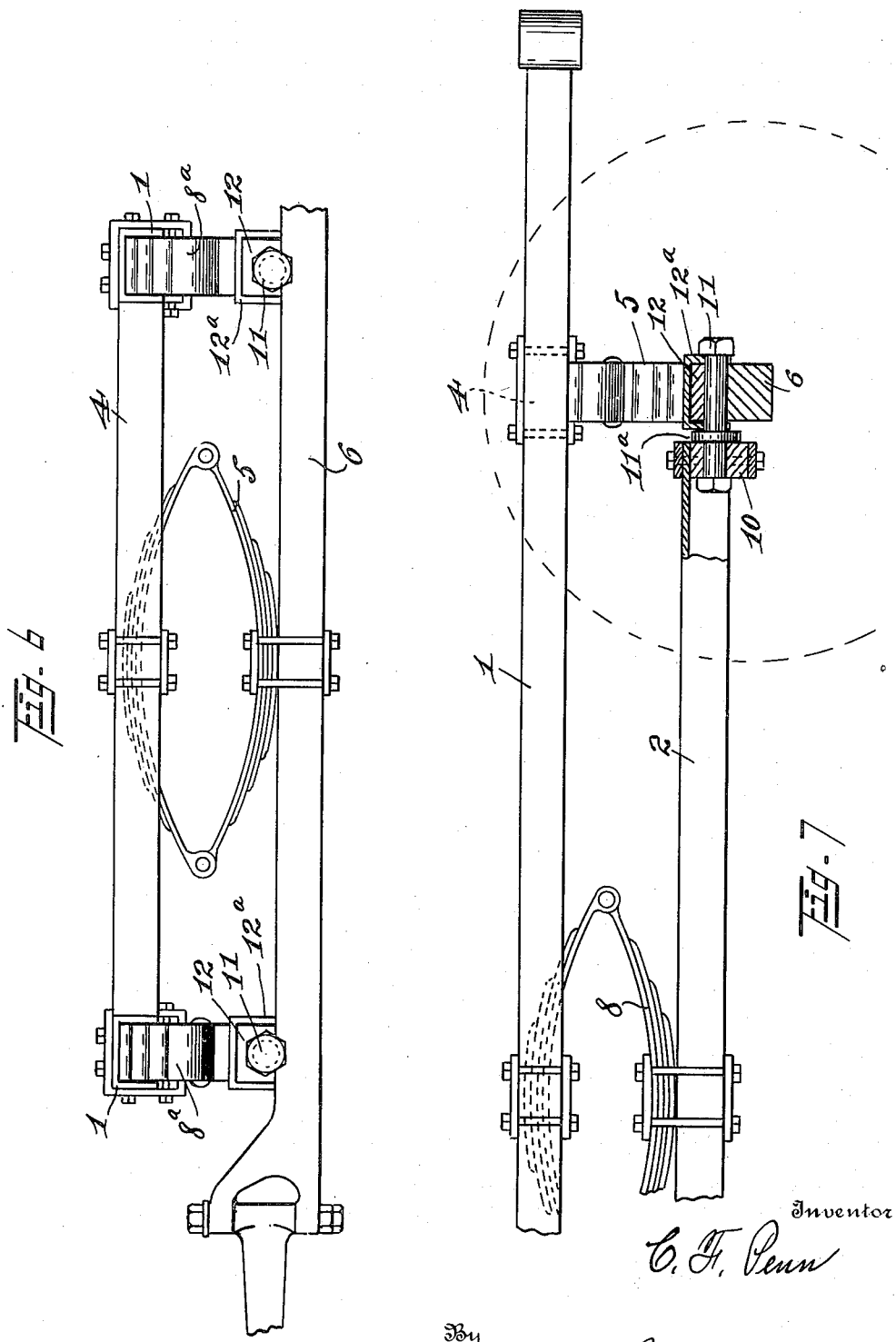

UNITED STATES PATENT OFFICE.

CHARLES F. PENN, OF SPOKANE, WASHINGTON, ASSIGNOR OF ONE-HALF TO RAYMOND O. SCAMBLER, OF SPOKANE, WASHINGTON.

VEHICLE CHASSIS.

1,414,749. Specification of Letters Patent. Patented May 2, 1922.

Application filed April 6, 1921. Serial No. 459,029.

*To all whom it may concern:*

Be it known that I, CHARLES F. PENN, a citizen of the United States, residing at Spokane, in the county of Spokane and State of Washington, have invented certain new and useful Improvements in Vehicle Chassis, of which the following is a specification.

My invention relates to improvements in vehicle chassis or supports for motor vehicles, such as automobiles, motor trucks, and the like.

The invention relates more particularly to the chassis or under frame structure, together with the spring suspension and articulated connections between the frame parts and the axles and other running gear parts.

The primary object of the invention is to provide a generally improved vehicle chassis which will not only be simple in construction, and efficient in operation, but one which will provide an improved support or suspension for the body and power plant of the vehicle with improved flexibility for permitting considerable distortion of the parts in compensating for unevenness or obstructions on the roadway.

The improved structure is particularly adapted to absorb obstructions and inequalities in the roadway, the improved arrangement being particularly adapted to maintain the body and engine in a substantially horizontal position notwithstanding great variations in the wheels in passing over obstructions and the like.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of a vehicle chassis frame structure constructed in accordance with this invention.

Fig. 2, a top plan view of the intermediate pivoted or articulated portions of the relatively fixed and movable chassis frame sections or side bars.

Fig. 3, a vertical longitudinal sectional view of the chassis side bars of one side thereof.

Fig. 4, a cross sectional view taken on line 4—4 of Fig. 3.

Fig. 5, a cross sectional view taken on line 5—5 of Fig. 3.

Fig. 6, an elevation of the front end of the same.

Fig. 7, a fragmentary side elevation of the front portion thereof and illustrating in particular the pivoted or articulated connection with the front axle.

Similar numerals of reference designate like parts throughout all the figures of the drawings.

The improved chassis or frame structure comprises what may be termed relatively fixed and movable chassis frame sections comprising a main chassis frame made up of front and rear pairs of rigidly connected or off-set chassis side bars 1, and $1^a$, respectively, the relatively movable chassis frame section, in the present instance, being made up of front and rear pairs of spring resisted oscillatory chassis side bars 2, and $2^a$, respectively. The chassis side bars 1, and $1^a$, and 2, and $2^a$, may be of any suitable and convenient form and, in the present instance, comprise channel shaped members as shown most clearly in the cross section in Figs. 4 and 5 of the drawings.

The side bars 1, and $1^a$, of the main chassis frame are vertically off-set intermediate the ends thereof, the off-set portions, in the present instance, being formed by means of bridge members $1^b$, rigidly connecting the front and rear side bars 1, and $1^a$, said bridge or off-set portions $1^b$, in the present instance, being secured by means of fastening elements or bolts $1^f$. The relatively rigid front frame section of the main chassis frame made up of the front bars 1, is adapted to support the engine or motor parts designated generally by the numeral 3, in Fig. 1 of the drawings, together with any suitable transmission gearing (not shown) adapted to lead to the differential gearing of the rear axle.

If desired the front bars 1, may be provided with a transverse bar 4, and may also be provided with a suitable spring 5, connected to the front axle 6.

The rear chassis side bars $1^a$, of the relatively rigid or main chassis frame are preferably connected to the rear axle having suitable gearing adapted to transmit the motion to the driving wheels 7.

The relatively movable chassis frame sections made up of the side bars 2, and 2ª, are arranged in alignment with the relatively fixed bars 1 and 1ª, and are flexibly connected to the ends thereof near the off-set portions 1ᵇ, in any suitable and convenient manner, in the present instance, by means of hinge members 1ᶜ, provided with cross or pivot bolts 1ᵈ, said hinge members being secured by means of fastening elements or bolts 1ᵉ. The relatively movable or oscillatory rear chassis frame section made up of the side bars 2ª, is adapted to support the body of the vehicle in any suitable and convenient manner and is connected to the rear section of the main chassis frame by means of springs 8. The front oscillatory chassis side bars 2, are preferably articulated at a suitable point to compensate for and to permit varying vertical movements of the front axle independently of the relatively fixed or rigid chassis frame, and said side bars 2, are connected to the upper fixed side bars 1, by means of springs 8ª. The springs 5, 8, and 8ª, may be of any suitable and convenient construction.

The side bars 1, and 1ª, and 2, and 2ª, may be held in proper spaced relation relative to each other horizontally in any suitable and convenient manner, as for example,—by means of transversely extending connecting and spacing bars 9, as shown most clearly in Figs. 2 and 3, of the drawings.

As a convenient means of flexibly connecting the front ends of the relatively movable side bars 2, with the front axle 6, the front ends of said bars may be provided with bearing blocks 10, provided with bearing bolts 11, the latter extending through suitable bearing blocks 12, formed on the front axle and connected by clips 12ª, said bolts 11, being provided with intermediate spacing collars 11ª, as shown most clearly in Fig. 7 of the drawings.

The rear ends of the side bars 2, near their pivoted ends are preferably separated and coupled together by means of bearing blocks 13, spaced a suitable distance apart and connected by means of a pivot or swivel bolt 14, provided with a spacing collar or flanges 14ª, as shown most clearly in Figs. 3, and 5, of the drawings. The blocks 13, may be secured by means of fastening bolts 15, and surrounding rings or clips 16. By reason of this construction it will be seen that the bars 2, will be permitted to swivel or twist relative to the front axle 6, and relative to the rear hinge connections of the side bars 2, to the relatively fixed or off-set portions of the main chassis frame thus permitting of great flexibility in the parts.

From the foregoing description, taken in connection with the accompanying drawings, the operation and advantages of my invention will be readily understood.

Having thus described one of the embodiments of my invention, without having attempted to set forth all the forms in which it may be made, or all the modes of its use, what I claim and desire to secure by Letters Patent, is,—

1. A vehicle chassis, comprising a main chassis frame embodying vertically off-set chassis frame sections, and spring resisted oscillatory chassis frame sections carried below the latter.

2. A vehicle chassis, comprising a main chassis frame embodying front and rear pairs of rigidly connected vertically off-set chassis bars, and spring resisted oscillatory chassis bars carried beneath the latter.

3. In a chassis, main chassis side bars vertically off-set intermediate the ends thereof, and floating chassis side bars above and below said main chassis side bars and flexibly connected therewith.

4. In a chassis, main chassis side bars vertically off-set and rigidly connected intermediate the ends thereof, and floating chassis side bars in alignment with said main chassis side bars and flexibly connected thereto.

5. A chassis, including main chassis side bars vertically off-set intermediate their ends, oscillatory chassis side bars pivotally connected to said main chassis side bars, and extending below the latter and springs interposed between said oscillatory and main chassis side bars.

6. A chassis, including main chassis side bars vertically off-set and rigidly connected intermediate their ends, oscillatory chassis side bars flexibly connected to the off-set rigidly connected portions of said main chassis side bars and extending below the latter, and springs interposed between and connected to said oscillatory and main chassis side bars.

7. A vehicle chassis, comprising relatively fixed and movable chassis frame sections, said main chassis frame section being provided with off-set bridge members approximately midway of its ends and said relatively movable chassis frame sections being flexibly connected to said off-set bridge members of said main chassis frame section and provided with springs attached to said main chassis frame, the front movable chassis frame section being articulated and connected to the front axle.

8. In a vehicle, including front and rear axles and a prime mover, and movable chassis frame sections, said relatively fixed chassis frame section being connected to said rear axle and said prime mover, and said relatively movable chassis frame sections being pivotally connected to said main chassis frame section, interposed between said main and movable chassis frame sections, the front movable chassis frame section being flexibly connected to said front axle.

9. In a vehicle, including a motor and front and rear axles, a main chassis frame embodying front and rear sections, said front section being adapted to support the motor, and said rear section being connected to the rear axle, a movable rear chassis frame flexibly connected to said main chassis frame, and a chassis section flexibly connected to said main chassis frame and said front axle.

10. A vehicle chassis, comprising a main chassis frame embodying off-set front and rear sections, said front section being adapted to support the motor and transmission gearing and said rear section being connected to the rear axle and differential gearing, an oscillatory rear chassis frame flexibly connected to said off-set section and provided with springs connected to said rear chassis section, an articulated oscillatory chassis section flexibly connected to said rear main chassis section and the front axle of the vehicle, and springs interposed between said oscillatory chassis sections and said main chassis sections.

In testimony whereof I have affixed signature.

CHARLES F. PENN.